US012468238B2

(12) United States Patent
Day et al.

(10) Patent No.: US 12,468,238 B2
(45) Date of Patent: Nov. 11, 2025

(54) TONER CONTAINER HAVING A MAGNET FOR TONER LEVEL SENSING

(71) Applicant: LEXMARK INTERNATIONAL, INC., Lexington, KY (US)

(72) Inventors: Michael Charles Day, Lexington, KY (US); Richard Louis Goin, Lexington, KY (US); Kyle Bradley Martin, Paducah, KY (US); Charles Russell Schaefer, Lexington, KY (US); Brittany Nicole Sexton, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 18/619,593

(22) Filed: Mar. 28, 2024

(65) Prior Publication Data

US 2025/0237973 A1 Jul. 24, 2025

Related U.S. Application Data

(60) Provisional application No. 63/623,464, filed on Jan. 22, 2024.

(51) Int. Cl.
*G03G 15/08* (2006.01)

(52) U.S. Cl.
CPC ....... *G03G 15/086* (2013.01); *G03G 15/0875* (2013.01); *G03G 2215/068* (2013.01); *G03G 2215/0888* (2013.01)

(58) Field of Classification Search
CPC ........... G03G 15/0853; G03G 15/0856; G03G 15/086; G03G 15/0875; G03G 2215/0888
See application file for complete search history.

(56) References Cited

U.S. PATENT DOCUMENTS

| | | | |
|---|---|---|---|
| 5,634,169 | A | 5/1997 | Barry et al. |
| 5,995,772 | A | 11/1999 | Barry et al. |
| 6,100,601 | A | 8/2000 | Baker et al. |
| 6,510,291 | B2 | 1/2003 | Campbell et al. |
| 8,150,297 | B2 | 4/2012 | Gayne et al. |
| 8,989,611 | B2 | 3/2015 | Leemhuis et al. |
| 9,069,286 | B2 | 6/2015 | Leemhuis et al. |
| 9,104,134 | B2 | 8/2015 | Leemhuis et al. |
| 9,152,080 | B2 | 10/2015 | Leemhuis et al. |

(Continued)

OTHER PUBLICATIONS

International Search Report and Written Opinion of the International Searching Authority dated May 8, 2025 for PCT Application No. PCT/US2025/012104.

*Primary Examiner* — Hoang X Ngo

(57) ABSTRACT

A toner container for use in an image forming device includes a housing having a reservoir for storing toner, a paddle positioned within the reservoir, and a rotatable drive member positioned to push the paddle in a first rotational direction. The paddle is free to rotate ahead of the drive member in the first rotational direction. A magnet is rotatably coupled to one of the paddle and the drive member. A shield is rotatably coupled to the other of the paddle and the drive member such that the shield is movable between a blocking position for attenuating a magnetic field of the magnet to block detection of the magnetic field by a magnetic sensor and an unblocking position for unblocking the magnetic field of the magnet to permit detection of the magnetic field by the magnetic sensor based on a rotational position of the paddle relative to the drive member.

16 Claims, 15 Drawing Sheets

(56) References Cited

U.S. PATENT DOCUMENTS

| | | | |
|---|---|---|---|
| 9,389,582 | B2 | 7/2016 | Carpenter et al. |
| 9,519,243 | B2 | 12/2016 | Carpenter et al. |
| 10,345,736 | B1 | 7/2019 | Leemhuis |
| 10,429,765 | B1 | 10/2019 | Leemhuis |
| 2011/0064502 | A1 | 3/2011 | Hase et al. |
| 2014/0169808 | A1 | 6/2014 | Leemhuis et al. |
| 2020/0026221 | A1 | 1/2020 | Leemhuis et al. |
| 2020/0307694 | A1 | 10/2020 | Toyama |
| 2023/0305434 | A1 | 9/2023 | Chapman et al. |

TONER CONTAINER HAVING A MAGNET FOR TONER LEVEL SENSING

CROSS REFERENCES TO RELATED APPLICATIONS

This application claims priority to U.S. Provisional Patent Application Ser. No. 63/623,464, filed Jan. 22, 2024, entitled "Toner Container Having a Falling Paddle for Toner Level Sensing," the content of which is hereby incorporated by reference in its entirety.

BACKGROUND

1. Field of the Disclosure

The present disclosure relates generally to image forming devices and more particularly a toner container for an image forming device having a falling paddle for toner level sensing.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles are then electrostatically picked up by the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units having a shorter lifespan than the image forming device. Some image forming devices include a first replaceable unit in the form of a toner cartridge that holds a main toner supply of the image forming device and feeds toner through an outlet port of the toner cartridge to an inlet port of a second replaceable unit, sometimes referred to as an imaging unit or a developer unit. As these replaceable units run out of toner, the units must be replaced or refilled in order to continue printing. As a result, it is desired to measure the amount of toner remaining in these units in order to warn the user that one of the replaceable units is near an empty state or to prevent printing after one of the units is empty in order to prevent damage to the image forming device. Accordingly, a system for measuring the amount of toner remaining in a replaceable unit of an image forming device is desired.

SUMMARY

A toner container for use in an image forming device according to one example embodiment includes a housing having a reservoir for storing toner, a rotatable paddle positioned within the reservoir, and a rotatable drive member positioned to push the paddle in a first rotational direction. The paddle is free to rotate ahead of the drive member in the first rotational direction. A magnet having a magnetic field is rotatably coupled to one of the paddle and the drive member. A shield is rotatably coupled to the other of the paddle and the drive member such that the shield is movable between a blocking position for attenuating the magnetic field of the magnet to block detection of the magnetic field by a magnetic sensor and an unblocking position for unblocking the magnetic field of the magnet to permit detection of the magnetic field by the magnetic sensor based on a rotational position of the paddle relative to the drive member.

In one embodiment, the magnet is rotatably coupled to the drive member and the shield is rotatably coupled to the paddle.

Embodiments include those wherein the drive member is positioned outside of the reservoir. In one embodiment, the magnet is positioned on the drive member. In some embodiments, a rotatable member is positioned outside of the reservoir and rotatably coupled to the paddle and the drive member is positioned to contact and push the rotatable member in the first rotational direction. In some embodiments, a rotatable member is positioned outside of the reservoir and rotatably coupled to the paddle and the shield is positioned on the rotatable member.

Embodiments include those wherein the shield is in the blocking position when the drive member is pushing the paddle in the first rotational direction and the shield is in the unblocking position when the paddle rotates ahead of the drive member in the first rotational direction.

A toner container for use in an image forming device according to another example embodiment includes a housing having a reservoir for storing toner, a rotatable drive coupler positioned to receive rotational force from a corresponding drive coupler in the image forming device when the toner container is installed in the image forming device, and a paddle positioned within the reservoir. The paddle is operatively connected to the drive coupler such that the paddle is rotatable in response to rotation of the drive coupler. The paddle is rotatable independent of the drive coupler. A magnet having a magnetic field is fixed to rotate with one of the paddle and the drive coupler. A shield is fixed to rotate with the other of the paddle and the drive coupler such that the shield is movable between a blocking position for attenuating the magnetic field of the magnet to block detection of the magnetic field by a magnetic sensor and an unblocking position for unblocking the magnetic field of the magnet to permit detection of the magnetic field by the magnetic sensor depending on a rotational position of the paddle relative to the drive coupler.

In one embodiment, the magnet is fixed to rotate with the drive coupler and the shield is fixed to rotate with the paddle.

Embodiments include those wherein a drive member is rotatably coupled to the drive coupler and the magnet is positioned on the drive member. In one embodiment, the drive member is positioned outside of the reservoir. In some embodiments, a rotatable member is positioned outside of the reservoir and fixed to rotate with the paddle, and the shield is positioned on the rotatable member.

A toner container for use in an image forming device according to another example embodiment includes a housing having a reservoir for storing toner, a rotatable shaft positioned within the reservoir, and a paddle mounted on the shaft within the reservoir and fixed to rotate with the shaft. A drive member is mounted on the housing outside of the reservoir and is rotatable about the shaft independent of the shaft. A magnet is fixed to rotate with the drive member and has a magnetic field that is detectable by a magnetic sensor. A shield is fixed to rotate with the shaft and the paddle. The drive member is positioned to rotate the shield when the drive member rotates, and the shield is free to rotate ahead of the drive member. The shield selectively blocks and unblocks the magnet from the magnetic sensor in response to rotation of the drive member for indicating a toner level in the reservoir. In one embodiment, the magnet is positioned on the drive member.

Embodiments include those wherein a rotatable member is positioned outside of the reservoir and fixed to rotate with the paddle, and the shield is positioned on the rotatable member. In some embodiments, the shield blocks the magnet when the drive member is rotating the shield and the shield unblocks the magnet when the shield rotates ahead of the drive member.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
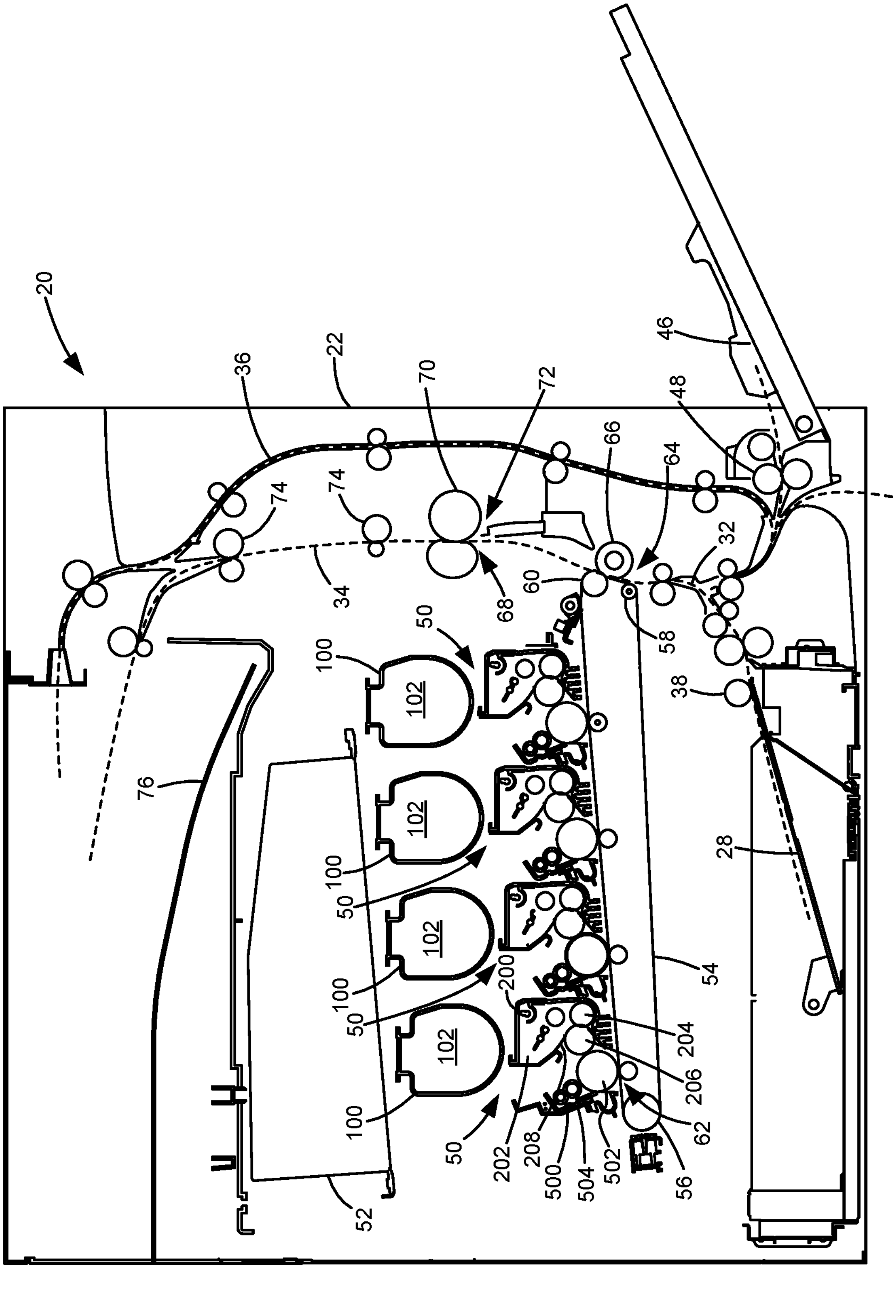
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. Each imaging station 50 includes a toner cartridge 100, a developer unit 200 and a photoconductor unit (PC unit) 500. Each toner cartridge 100 includes a reservoir 102 for holding toner and an outlet port in communication with an inlet port of a corresponding developer unit 200 for transferring toner from reservoir 102 to developer unit 200. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 500 includes a charging roll 504 and a photoconductive (PC) drum 502 for each imaging station 50. PC drums 502 are mounted substantially parallel to each other. For purposes of clarity, developer unit 200 and PC unit 500 are labeled on only one of the imaging stations 50 in FIG. 1. In the example embodiment illustrated, each imaging station 50 is substantially the same except for the color or type of toner contained therein.

Each charging roll 504 forms a nip with the corresponding PC drum 502. During a print operation, charging roll 504 charges the surface of PC drum 302 to a specified voltage. A laser beam from a printhead 52 associated with each imaging station 50 is then directed to the surface of PC drum 502 and selectively discharges those areas it contacts to form a latent image. Developer roll 206 then transfers toner to PC drum 502 to form a toner image. A metering device, such as a doctor blade 208, may be used to meter toner on developer roll 206 and apply a desired charge to the toner prior to its transfer to PC drum 502. Toner is attracted to the areas of PC drum 502 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 502 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 502.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20 that may include multiple imaging stations 50.

Figure 2A:
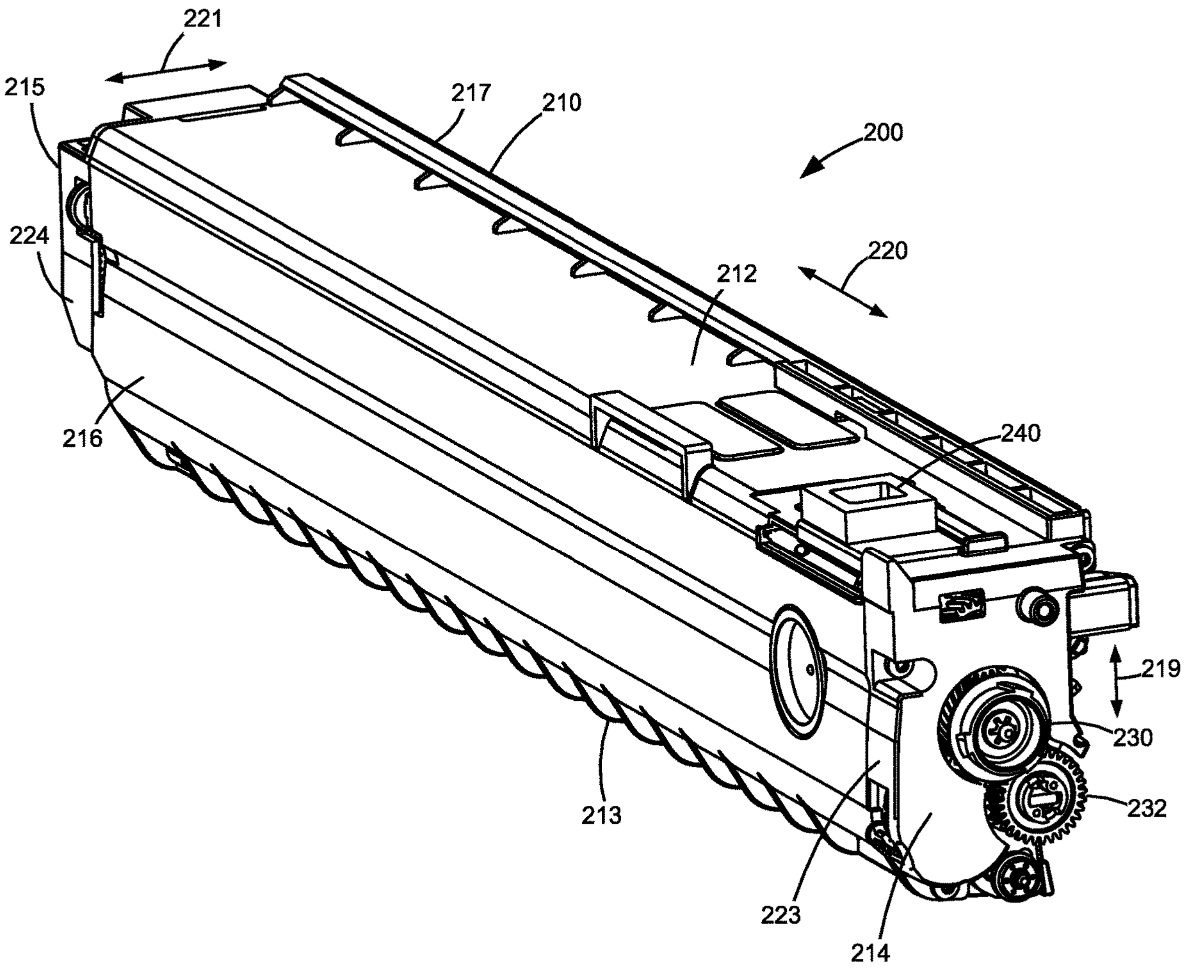
FIGS. 2A and 2B are perspective views of a developer unit according to one example embodiment.
Figure 2B:
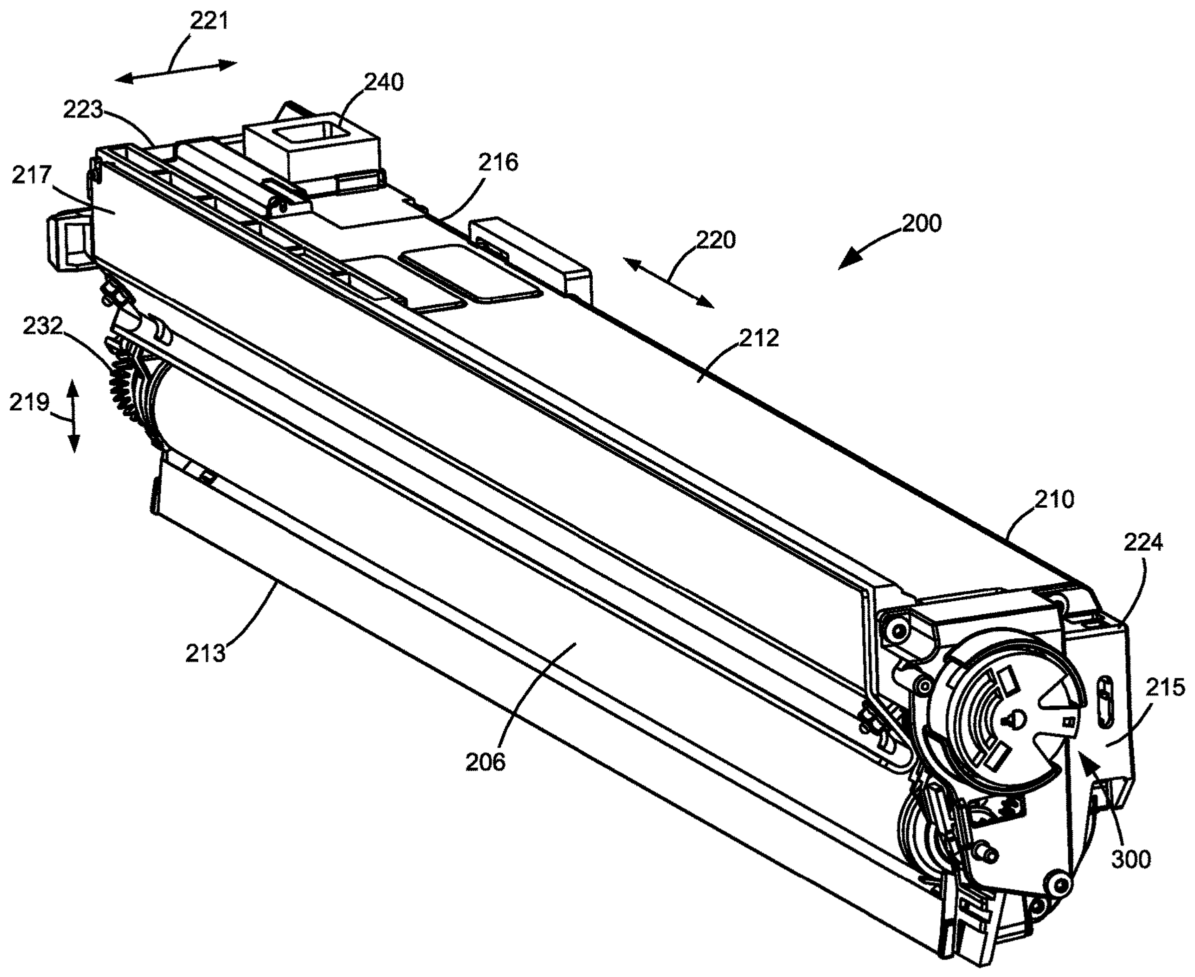

FIGS. 2A and 2B show developer unit 200 according to one example embodiment. Developer unit 200 includes a body 210 housing toner reservoir 202 therein. Body 210 includes a top 212, a bottom 213, a front end 214, a rear end 215 and a pair of sides 216, 217. Body 210 has a height measured along a vertical dimension 219 of developer unit 200 between top 212 and bottom 213, a length measured along a longitudinal dimension 220 of developer unit 200 orthogonal to vertical dimension 219 between front end 214 and rear end 215, and a width measured along a side-to-side dimension 221 of developer unit 200 orthogonal to vertical dimension 219 and longitudinal dimension 220 between side 216 and side 217. In the example embodiment illustrated, each end 214, 215 of body 210 includes a respective end cap 223, 224 mounted on a corresponding end wall at each end 214, 215, such as by suitable fasteners (e.g., screws, rivets, etc.) or by a snap-fit engagement. In this embodiment, the end wall at front end 214 and the end wall at rear end 215 along with top 212, bottom 213 and sides 216, 217 form toner reservoir 202.

In the embodiment illustrated, a drive coupler 230 is exposed on an outer portion of body 210 in position to receive rotational force from a corresponding drive system in image forming device 20 when developer unit 200 is installed in image forming device 200 to drive rotatable components of developer unit 200. The drive system in image forming device 20 may include one or more drive motors and a drive transmission from the drive motor(s) to a drive coupler that mates with drive coupler 230 of developer unit 200 when developer unit 200 is installed in image forming device 20. In the example embodiment illustrated, drive coupler 230 is positioned on front end 214 of body 210. In the example embodiment illustrated, drive coupler 230 is configured to mate with and receive rotational motion from the corresponding drive coupler in image forming device 20 at the axial end of drive coupler 230. Drive coupler 230 is operatively connected (either directly or indirectly through one or more intermediate gears, such as gear 232) to rotatable components of developer unit 200 including, for example, toner adder roll 204 and developer roll 206, to rotate toner adder roll 204 and developer roll 206 upon receiving rotational force from the corresponding drive system in image forming device 22. Any additional rotatable components of developer unit 200, e.g., one or more toner agitators or augers positioned in toner reservoir 202, if present, may be connected to drive coupler 230 by one or more gears.

Developer unit 200 includes an inlet port 240 positioned to receive toner from an outlet port (not shown) of toner cartridge 100 to replenish reservoir 202 as toner is consumed from reservoir 202 by the printing process. In the example embodiment illustrated, inlet port 240 is positioned on top 212 of body 210 near front end 214.

Figure 3:
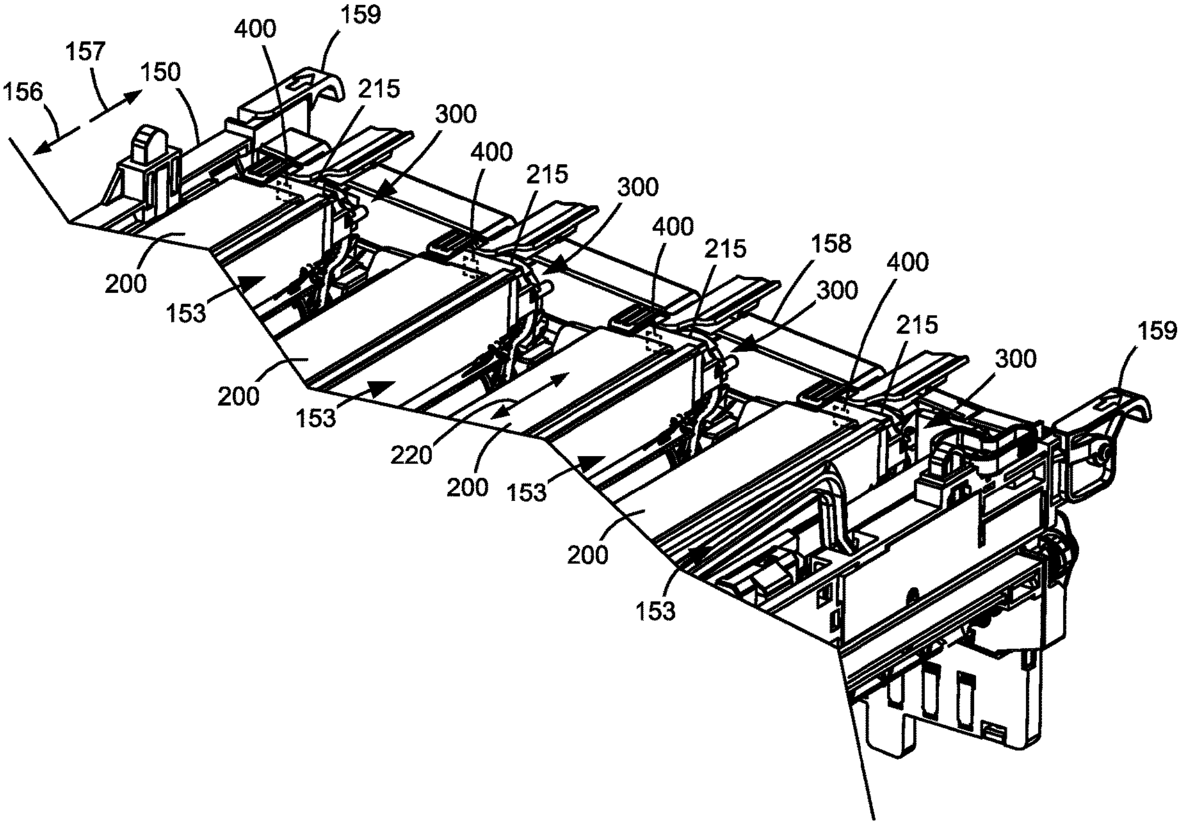
FIG. 3 is a perspective view of an imaging basket holding four developer units according to one example embodiment.

With reference to FIG. 3, image forming device 20 includes an imaging basket 150 configured to receive and support four developer units 200 in image forming device 20. Developer units 200 are vertically insertable into and removable from four corresponding positioning slots 153 of imaging basket 150. Positioning slots 153 of imaging basket 150 locate developer units 200 in their operating positions within image forming device 20 when developer units 200 are installed in imaging basket 150 and imaging basket 150 is inserted into image forming device 20. Imaging basket 150 is slidable into and out of image forming device 20 in a direction corresponding to longitudinal dimension 220 of each developer unit 200. In the embodiment illustrated, imaging basket 150 is insertable into image forming device 20 in a first direction 156 and removable from image forming device 20 in a second direction 157. Imaging basket 150 has a rear 158 that trails during insertion of imaging basket 150 into image forming device 20 in first direction 156 and that leads during removal of imaging basket 150 from image forming device 20 in second direction 157. In the embodiment illustrated, imaging basket 150 includes a pair of handles 159 positioned at rear 158 of imaging basket 150 to assist the user with handling imaging basket 150.

As used herein, the terms "front" and "rear" correspond to the direction of travel of developer unit 200 when developer unit 200 is inserted into image forming device 20 rather than any particular orientation of image forming device 20, such as when developer unit 200 is installed in imaging basket 150 and imaging basket 150 is inserted into image forming device 20. For example, in one embodiment, image forming device 20 is primarily operated, for example, accessing a user interface, media tray(s), supply item(s) (such as toner cartridge 100, developer unit 200, and PC unit 500) and other features of image forming device 20, at a side proximate to rear end 215 of body 210 of developer unit 200 and rear 158 of imaging basket 150.

Figure 4:
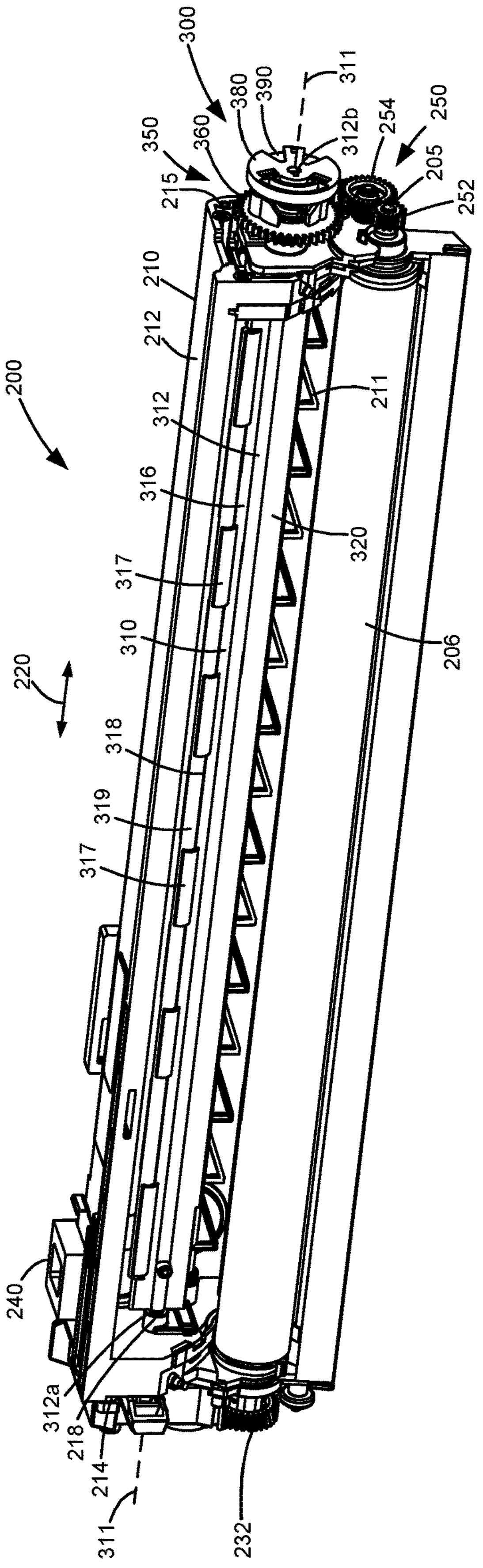
FIG. 4 is a perspective view of the developer unit shown in FIGS. 2A and 2B with portions removed to show interior components according to one example embodiment.
Figure 5:
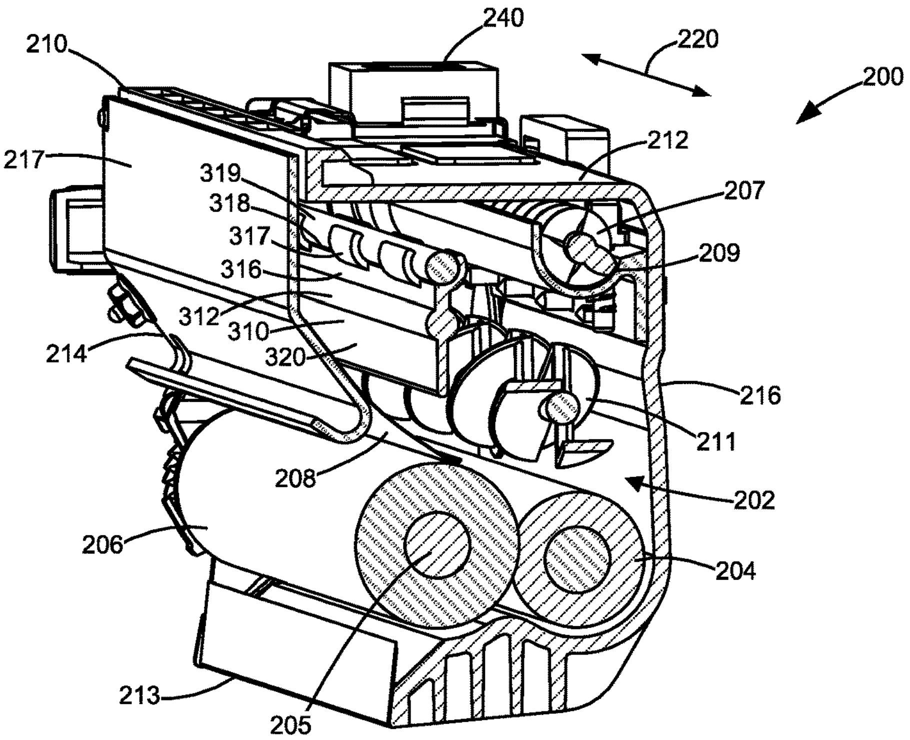
FIG. 5 is a perspective section view of the developer unit shown in FIGS. 2A and 2B according to one example embodiment.
Figure 6:
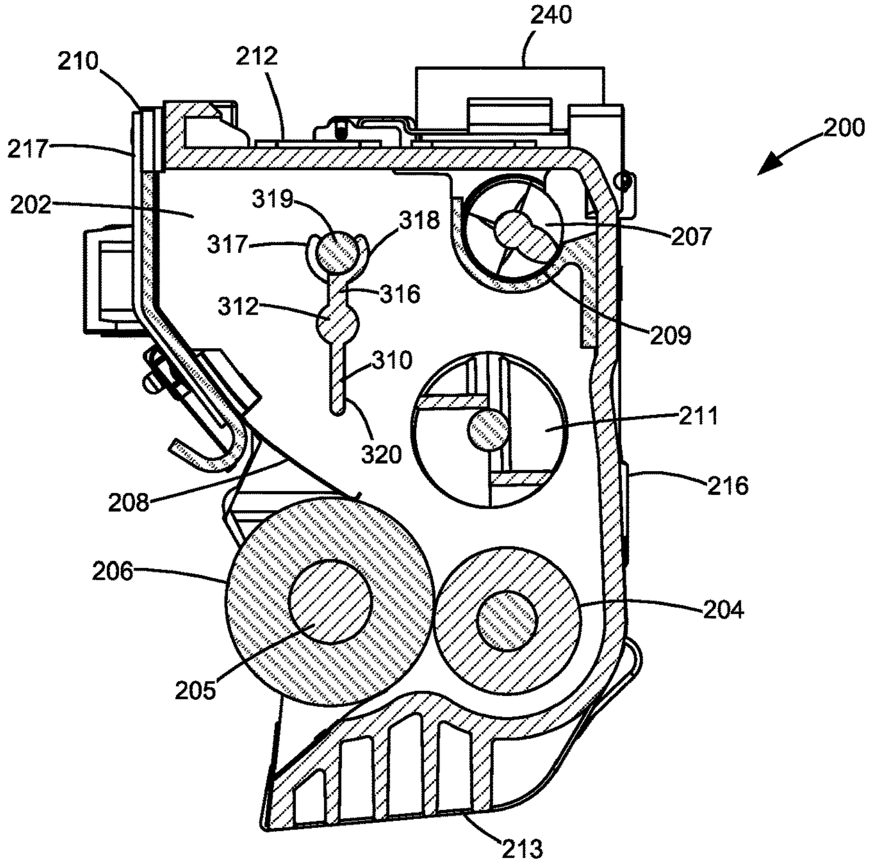
FIG. 6 is a side section view of the developer unit shown in FIGS. 2A and 2B according to one example embodiment.
Figure 7:
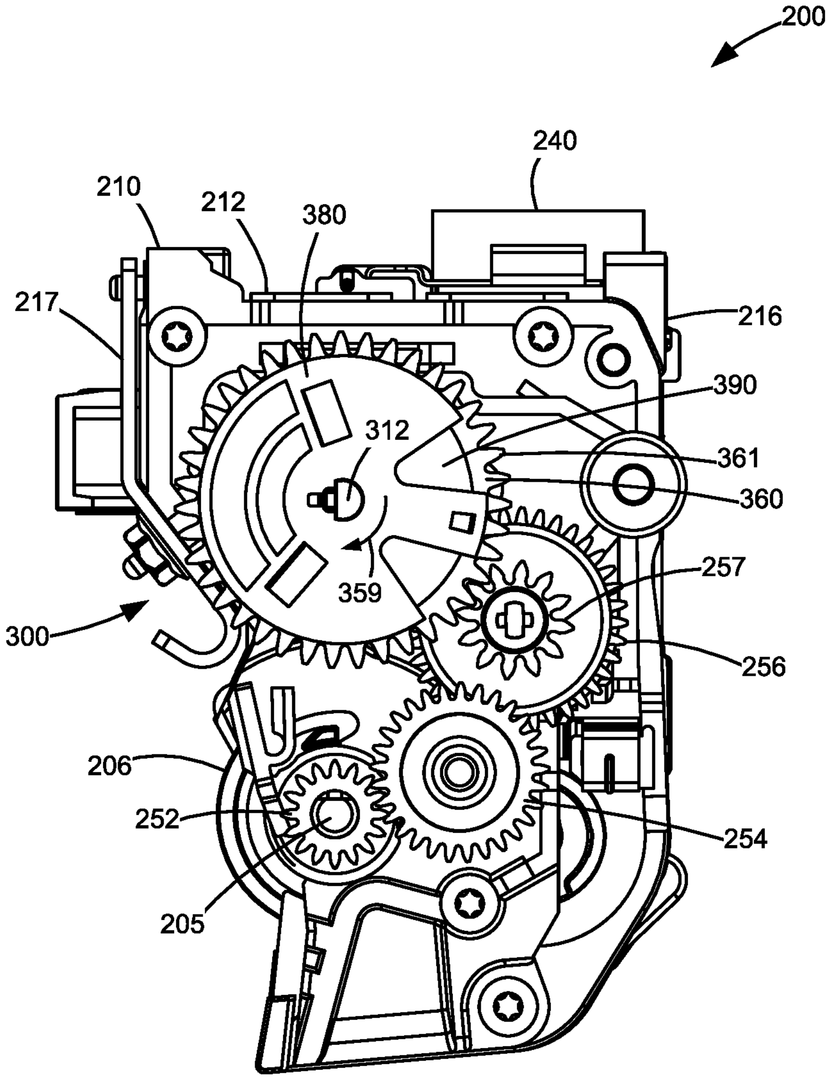
FIG. 7 is a side elevation view of the developer unit shown in FIGS. 2A and 2B.

FIG. 4 is a perspective view showing developer unit 200 with portions of developer unit 200, including doctor blade 208 and side 217 of body 210, omitted to show interior components of developer unit 200. FIG. 5 is a perspective section view of developer unit 200, and FIG. 6 is a side section view of developer unit 200. FIG. 7 is a side elevation view facing rear end 215 of developer unit 200.

Developer unit 102 includes toner reservoir 202 for storing toner and developer roll 206 that supplies toner from toner reservoir 202 to PC drum 502. In the example embodiment illustrated, toner adder roll 204 supplies toner from toner reservoir 202 to developer roll 206. Doctor blade 208, which is disposed along developer roll 206, provides a substantially uniform layer of toner on developer roll 206 for transfer to PC drum 502. An auger 207 is positioned in a channel 209 that runs along longitudinal dimension 220 of developer unit 200 for distributing toner received by inlet port 240 from the outlet port of toner cartridge 100 within toner reservoir 202. One or more movable toner agitators 211 are provided in toner reservoir 202 to distribute the toner therein and to break up any clumped toner.

In the example embodiment illustrated, gear 232 operatively connects drive coupler 230 to developer roll 206 such that drive coupler 230 rotates developer roll 206 when drive coupler 230 rotates. A drive mechanism 250 is positioned at rear end 215 of body 210. In the example embodiment illustrated, drive mechanism 250 includes a drive train that transfers rotational power from developer roll 206 to toner agitator 211. In the example embodiment illustrated, a driven gear 252 is mounted on a shaft 205 of developer roll 206 such that driven gear 252 rotates with developer roll 206. A compound idler gear 254 is positioned to mesh with driven gear 252 of developer roll 206 and a gear 256 of toner agitator 211. When developer roll 206 rotates upon being driven by drive gear 232, driven gear 252 of developer roll 206 also rotates, transferring rotational force to compound idler gear 254 and gear 256 of toner agitator 211 which, in turn, rotates toner agitator 211.

Developer unit 200 includes a toner level sensing system 300 for detecting a toner level within toner reservoir 202. In the example embodiment illustrated, toner level sensing system 300 includes a paddle 310 positioned within reservoir 202 and a sense mechanism 350 operatively connected to paddle 310 for determining toner level in reservoir 202 based on the motion of paddle 310, as discussed in greater detail below. In the example embodiment illustrated, paddle 310 is fixedly mounted on a shaft 312 that extends along longitudinal dimension 220 of body 210. First and second axial ends 312*a*, 312*b* of shaft 312 pass through aligned opposed openings 218 at front and rear ends 214, 215 of body 210 such that shaft 312 is rotatable about a rotational axis 311. First and second axial ends 312*a*, 312*b* of shaft 312 are free to rotate within the corresponding openings at front and rear ends 214, 215 of body 210 such that paddle 310 is freely rotatable within toner reservoir 202. Paddle 310 is spaced from the interior surfaces of toner reservoir 202 so that the interior surfaces do not impede the motion of paddle 310. In the example embodiment illustrated, paddle 310 is positioned directly above developer roll 206 but may be positioned elsewhere in toner reservoir 202 as desired.

Paddle 310 includes one or more paddle arms extending away from shaft 312, for example, radially from shaft 312. In the embodiment illustrated, paddle 310 is shown having a first paddle arm 316 and a second paddle arm 320. In one example embodiment, first paddle arm 316 is weighted relative to second paddle arm 320 such that paddle 310 may rotate as a result of the additional weight on first paddle arm 316 so as to cause paddle 310 to fall due to gravity after reaching a rotational apex of first paddle arm 316, as discussed below. In the example embodiment illustrated, first paddle arm 316 includes one or more radial mounts 317 at a free end 318 thereof for receiving a weighted rod 319. In other embodiments, weight may be added to first paddle arm 316 using other techniques.

Figure 8:
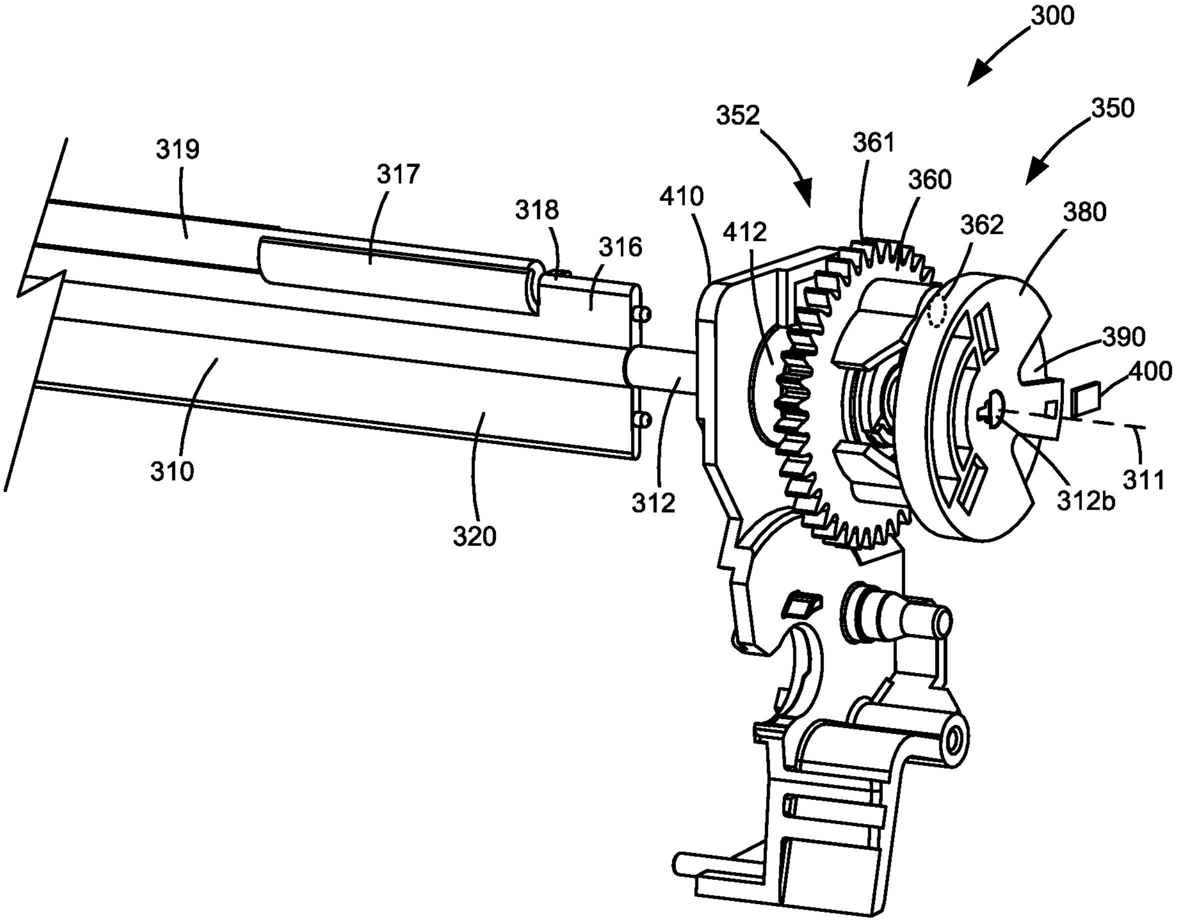
FIG. 8 is a perspective view of a toner level sensing system of the developer unit according to one example embodiment.
Figure 9A:
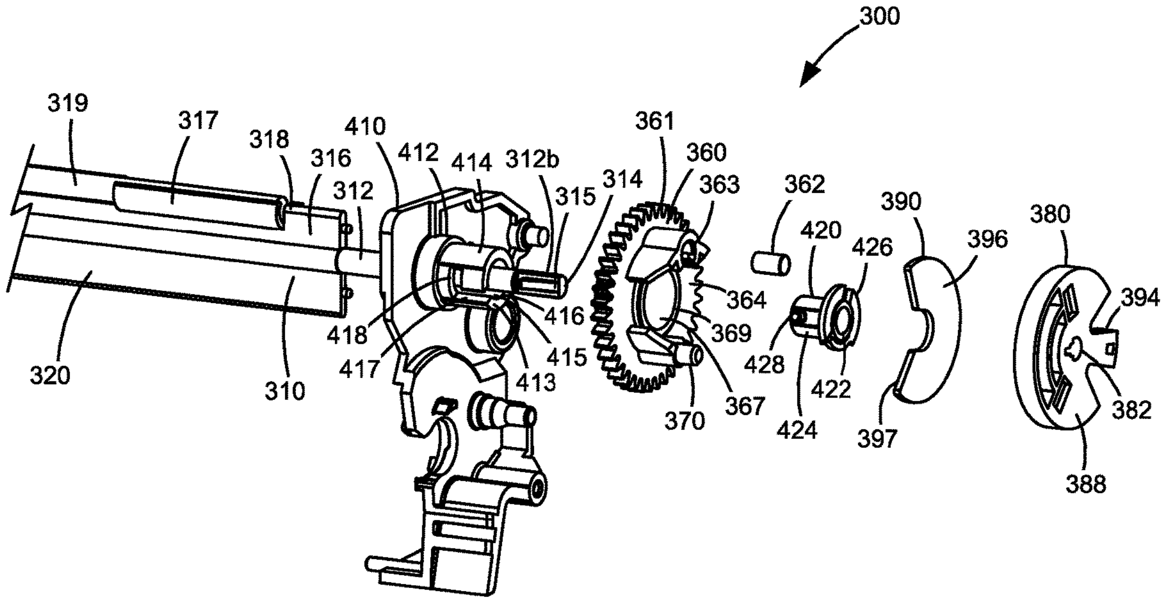
FIGS. 9A and 9B are exploded perspective views of the toner level sensing system shown in FIG. 8.
Figure 9B:
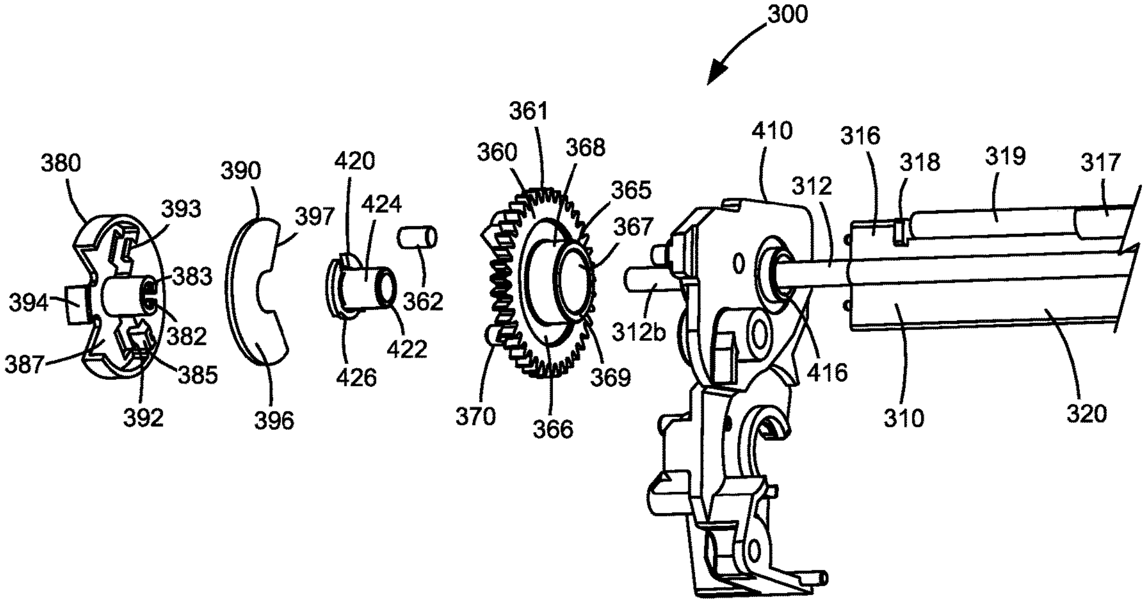

FIGS. 8-9B show toner level sensing system 300 in greater detail according to one example embodiment. FIG. 8 is a perspective view of toner level sensing system 300 including paddle 310 and sense mechanism 350. FIGS. 9A and 9B are exploded perspective views of toner level sensing system 300 shown in FIG. 8. Sense mechanism 350 of toner level sensing system 300 includes a drive assembly 352 for driving paddle 310 to rotate. In the embodiment illustrated, drive assembly 352 includes a drive member 360 and a rotatable member 380 mounted on second axial end 312*b* of shaft 312. Drive member 360 is rotatably mounted on shaft 312 independent of shaft 312 such that drive member 360 is free to rotate about shaft 312 and vice versa. Rotatable member 380 is mounted on shaft 312 and is fixed to rotate with shaft 312. In one example embodiment, drive member 360 is positioned to receive rotational force from gear 256 (See FIG. 7). In the example embodiment illustrated, drive member 360 includes a set of gear teeth 361 that meshes with a set of gear teeth 257 of gear 256 of toner agitator 211 such that drive member 360 also rotates in a rotational direction 359 when gear 256 of toner agitator 211 rotates during operation of developer unit 200. In other embodiments, drive member 360 may be driven to rotate with other components of developer unit 200 or may be driven independently from other components of developer unit 200.

Drive member 360 includes a permanent magnet 362 that rotates with drive member 360 and is detectable by a magnetic sensor 400, such as a hall effect sensor, for determining an amount of toner remaining in toner reservoir 202 as discussed in greater detail below. In one embodiment, magnet 362 is positioned on an outer face 364 of drive member 360 in order to permit detection by magnetic sensor 400 that is positioned on a portion of image forming device 20 adjacent to rear end 215 of developer unit 200 when developer unit 200 is installed in image forming device 20. In one example embodiment, magnetic sensor 400 may be disposed at rear 158 of imaging basket 150 (See FIG. 3 shown in phantom lines), such as on a circuit board disposed at rear 158 of imaging basket 150. In other embodiments, magnetic sensor 400 may be disposed at other locations so as to be able to detect magnet 362 during operation of toner level sensing system 300. In other embodiments, magnetic sensor 400 may be positioned on developer unit 200 itself, such as mounted directly on end cap 224.

In one example embodiment, drive member 360 is composed of non-magnetic material and magnet 362 is held by a friction fit in a cavity 363 in drive member 360. Magnet 362 may be attached to drive member 360 using an adhesive or fastener so long as magnet 362 will not dislodge from drive member 360 during operation of developer unit 200. In the embodiment illustrated, magnet 362 is cylindrical in shape. In other embodiments, magnet 362 may be any suitable size and/or shape so as to be detectable by magnetic sensor 400.

In the example embodiment illustrated, drive member 360 is mounted on a frame 410 disposed at rear end 215 of body 210. Frame 410 includes a boss 412 that protrudes outward along an axial dimension of paddle 310 at a location where second axial end 312*b* of shaft 312 passes through the corresponding end wall of rear end 215 of body 210. In the example embodiment illustrated, boss 412 includes a generally cylindrical wall having an outer axial face 413, an outer circumferential surface 414 and an inner circumferential surface 415 that defines a center opening 416. Drive member 360 includes a collar 365 extending axially inward toward frame 410 from an inner axial face 366 of drive member 360. Collar 365 of drive member 360 has an inner circumferential surface 367 and an outer circumferential surface 368. Inner circumferential surface 367 defines an opening 369 that is mounted about outer circumferential surface 414 of boss 412 such that drive member 360 is rotatable about boss 412.

In the example embodiment illustrated, center opening 416 of boss 412 is sized to receive a bushing 420. In the example embodiment illustrated, bushing 420 has a center opening 422 that is sized to receive second axial end 312*b* of shaft 312 and an outer circumferential surface 424 that is sized to be received by center opening 416 of boss 412. Bushing 420 is positioned to hold drive member 360 against boss 412. In the embodiment illustrated, bushing 420 includes a retainer head 426 that forms a contact surface for contacting outer axial face 413 of boss 412. A retention lug 428 extends radially outward from bushing 420 and is positioned to align with and be inserted into a corresponding axial channel 417 of boss 412 when bushing 420 is inserted into center opening 416 of boss 412. When bushing 420 is inserted into center opening 416 of boss 412 with drive member 360 rotatably mounted on boss 412, retainer head 428 of bushing 420 contacts outer axial face 413 of boss 412. Rotating bushing 420 in rotational direction 359 while retainer head 428 is in contact with outer axial face 413 of boss 412 positions retention lug 428 within a notch 418 formed on boss 412. In this manner, bushing 420 is prevented from rotating with drive member 360 when drive member 360 rotates in rotational direction 359 while preventing drive member 360 from disengaging from boss 412.

Rotatable member 380 is attached to second axial end 312*b* of shaft 312 such that rotatable member 380 is rotatable together with shaft 312 and, consequently, paddle 310. In the example embodiment illustrated, a D-shaped hole 382 is formed through rotatable member 380. D-shaped hole 382 is centered about a rotational axis of rotatable member 380 corresponding to rotational axis 311 of shaft 312. Second axial end 312*b* of shaft 312 has a corresponding D-shaped portion 314 that fits into D-shaped hole 382 of rotatable member 380 such that shaft 312 and rotatable member 380 are constrained to rotate together. A catch 383 is positioned within D-shaped hole 382 of rotatable member 380 such that when rotatable member 380 is attached to second axial end 312*b* of shaft 312 by inserting D-shaped portion 314 of shaft 312 into D-shaped hole 382 of rotatable member 380, catch 383 within D-shaped hole 382 of rotatable member 380 forms a snap fit engagement with a corresponding latch 315 on D-shaped portion 314 of shaft 312 to maintain axial alignment between rotatable member 380 and shaft 312 and to prevent rotatable member 380 from disengaging from shaft 312.

Rotatable member 380 is selectively engageable by drive member 360 and is rotatable with drive member 360 when drive member 360 engages rotatable member 380 during rotation of drive member 360. In the embodiment illustrated, drive member 360 includes a drive pin 370 that is positioned to engage an engagement surface 385 of rotatable member 380 and push rotatable member 380 to rotate with drive member 360 when drive member 360 rotates in rotational direction 359. Since rotatable member 380 is fixed to rotate with shaft 312 and shaft 312 is free to rotate within reservoir 202 as discussed above, rotatable member 380 is free to rotate ahead of drive member 360 in rotational direction 359 and disengage from drive pin 370 of drive member 360, such as when paddle 310 falls and rotates ahead of drive member 360 in rotational direction 359 as discussed in greater detail below.

Toner level sensing system 300 includes a shield 390 for blocking and unblocking magnet 362 from magnetic sensor 400. In the example embodiment illustrated, shield 390 is positioned between drive member 360 and rotatable member 380, such as on an inner face 387 of rotatable member 380. In the embodiment illustrated, shield 390 is retained against inner face 387 of rotatable member 380 by fasteners 392, 393, 394. In other embodiments, shield 390 may be attached to rotatable member 380 using an adhesive so long as shield 390 will not dislodge from rotatable member 380 during operation of developer unit 200. Other configurations with respect to mounting shield 390 to rotatable member 380 are also possible. For example, shield 390 may be attached to an outer face 388 of rotatable member 380 or molded as a single unit with rotatable member 380. Shield 390 may be made of composed of a suitable material which can attenuate the magnetic field of magnet 362 in order to effectively block magnetic sensor 400 from detecting magnet 362 as discussed below. For example, shield 390 may be composed of a ferromagnetic metal, such as steel, for shielding magnetic sensor 400 from the magnetic field of magnet 362 when shield 390 is in a blocking position. Rotatable member 380, which holds shield 390, may be made of non-magnetic and/or non-conductive material, such as polycarbonate or plastic material, that can allow magnetic field to pass through. In the example embodiment illustrated, shield 390 is shown as a circular disk having a blocking portion 396 and a circumferential cutout portion 397. Shield 390 is rotatable with rotatable member 380, shaft 312, and paddle 310 such that as the rotational position of paddle 310 changes, the position of blocking portion 396 and cutout portion 397 of shield 390 relative to magnet 362 and/or magnetic sensor 400 also changes. In particular, magnet 362 and magnetic sensor 400 are either blocked from each other by blocking portion 396 or unblocked relative to each other by cutout portion 397 of shield 390 depending on the rotational positions of drive member 360 and rotatable member 380. Since the rotational position of shield 390 relative to magnet 362 and/or magnetic sensor 400 depends on the rotational motion of rotatable member 380 (and, thus, paddle 310), concealment of magnet 362 by shield 390 and detection of magnet 362 by magnetic sensor 400 may be used for sensing motion of paddle 310. In one example embodiment, an estimate of an amount of toner in reservoir 202 is determined based on the sensed motion of paddle 310.

FIGS. 10A-11G are side views of developer unit 200 depicting operation of toner level sensing system 300 with different toner levels in reservoir 202 of developer unit 200. Various positions of paddle 310 are shown with corresponding positions of rotatable member 380, drive member 360, and magnet 362 relative to magnetic sensor 400. In the embodiment illustrated, magnetic sensor 400 is shown positioned about 3 o'clock with respect to shaft 312. In the figures shown, magnet 362 is either blocked or unblocked by shield 390. This provides an output signal from magnetic sensor 400 to indicate a driven motion or a falling motion of paddle 310 for determining an estimate of an amount of toner within developer unit 200 as discussed below.

Figure 10A:
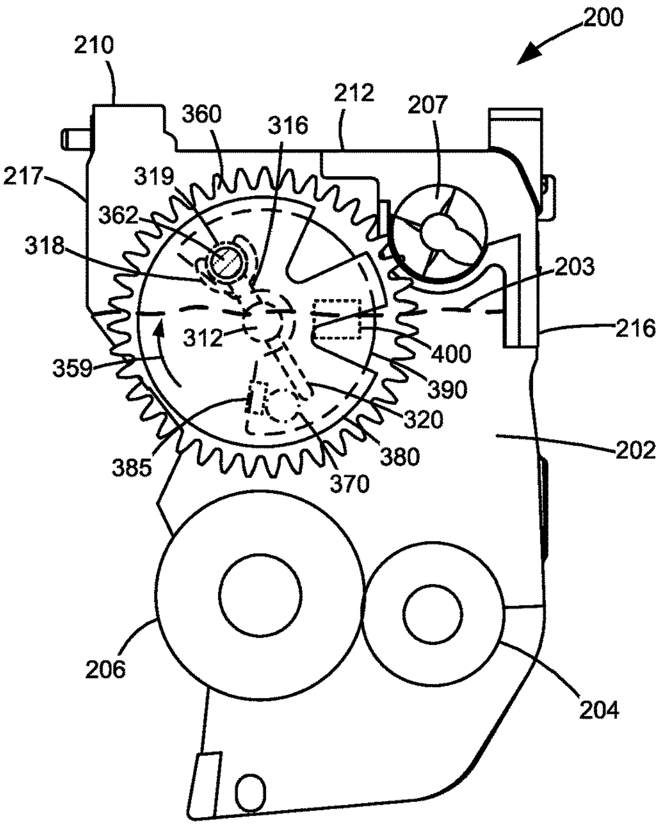
FIGS. 10A and 10B are side views depicting operation of the toner level sensing system of FIG. 8 when the developer unit is relatively full of toner according to one example embodiment.
Figure 10B:
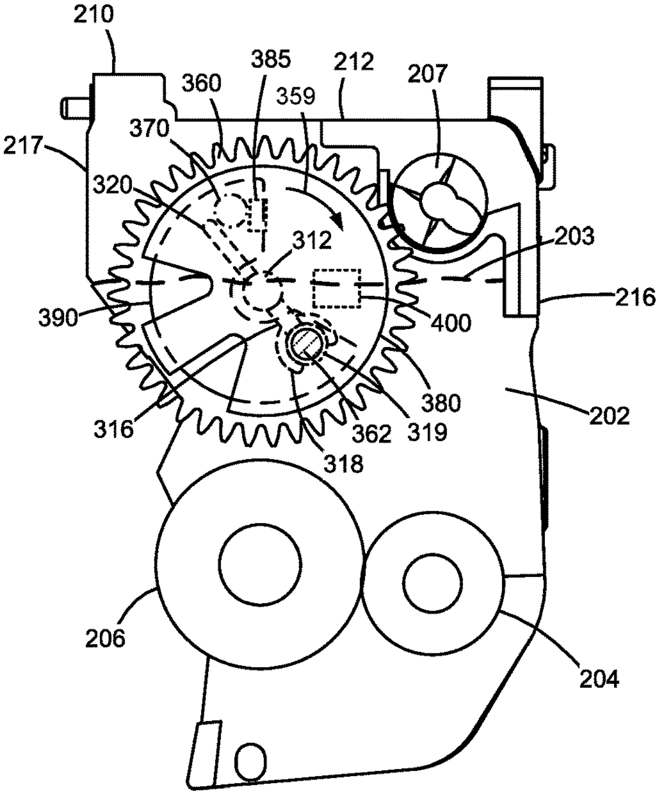

FIGS. 10A and 10B are side views depicting operation of toner level sensing system 300 when toner reservoir 202 of developer unit 200 is relatively full of toner 203. It will be appreciated that the toner level in FIGS. 10A and 10B is shown for illustration purposes and that a full toner level may be above or below the toner level depicted in FIGS. 10A and 10B. In the embodiment illustrated, resistance from toner 203 present in reservoir 202 prevents paddle 310 from rotating freely about rotational axis 311. Instead, as pin 370 of drive member 360 engages engagement surface 385 of rotatable member 380 and pushes rotatable member 380 to rotate with drive member 360 in rotational direction 359 when drive member 360 rotates, rotatable member 380 rotates shaft 312 in rotational direction 359 causing paddle 310 to also rotate in rotational direction 359 pushing through its rotational path against toner 203. As a result, paddle 310 rotates together with drive member 360 due to the resistance provided by toner 203 against second paddle arm 320 as shown in FIG. 10A and first paddle arm 316 as shown in FIG. 10B as paddle 310 rotates in rotational direction 359 which prevents weighted rod 319 from falling and paddle 310 and rotatable member 380 from advancing ahead of drive member 360. In the embodiment illustrated, blocking portion 396 of shield 390 on rotatable member 380 blocks magnet 362 on drive member 360 throughout the rotational cycle of paddle 310 when toner reservoir 202 is relatively full. The blocked arrangement of magnet 362 prevents magnetic sensor 400 from detecting magnet 362 as magnet 362 rotates with drive member 360 and passes magnetic sensor 400. In this embodiment, magnet 362 remains in an undetected state during rotation of drive member 360 indicating that rotatable member 380, shield 390, and paddle 310 are rotating with and are being driven by drive member 360 with magnet 362 undetectably passing magnetic sensor 400 as magnet 362 remains blocked by shield 390. The driven motion of paddle 310 (as opposed to a falling motion) may be used to indicate that the toner level in reservoir 202 is relatively full.

As the toner level in reservoir 202 decreases, paddle 310 experiences less resistance from toner 203. FIGS. 11A-11G are side views depicting the relationship between paddle 310, rotatable member 380, drive member 360, and magnet 362 relative to magnetic sensor 400 during operation of toner level sensing system 300 when the toner level in reservoir 202 has decreased from the toner level shown in FIGS. 10A and 10B to a toner level that is low enough that weighted rod 319 falls forward and paddle 310 and rotatable member 380 rotate ahead of drive member 360 in rotational direction 359. It will be appreciated that the toner level in FIGS. 11A-11G is shown for illustration purposes and that a relatively low toner level may be above or below the toner level depicted in FIGS. 11A-11G.

Figure 11A:
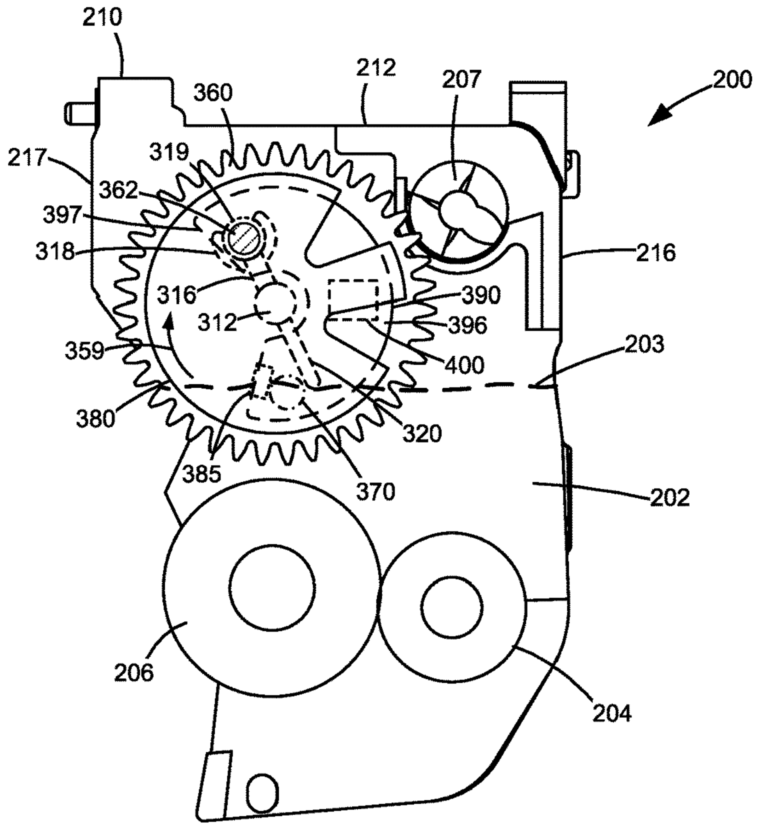
FIGS. 11A-11G are side views depicting operation of the toner level sensing system of FIG. 8 when the developer unit is relatively low on toner according to one example embodiment.
Figure 11B:
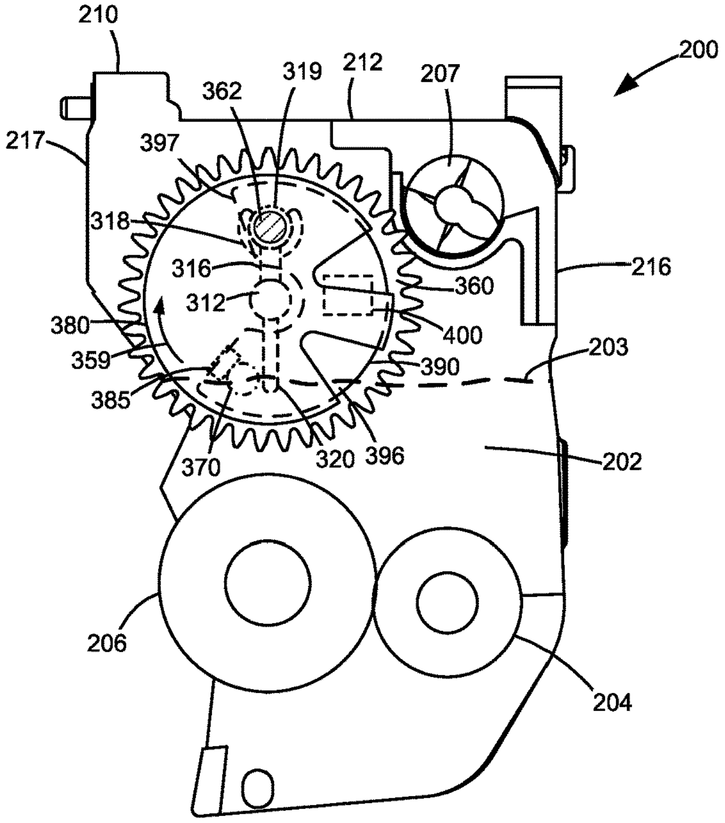
Figure 11C:
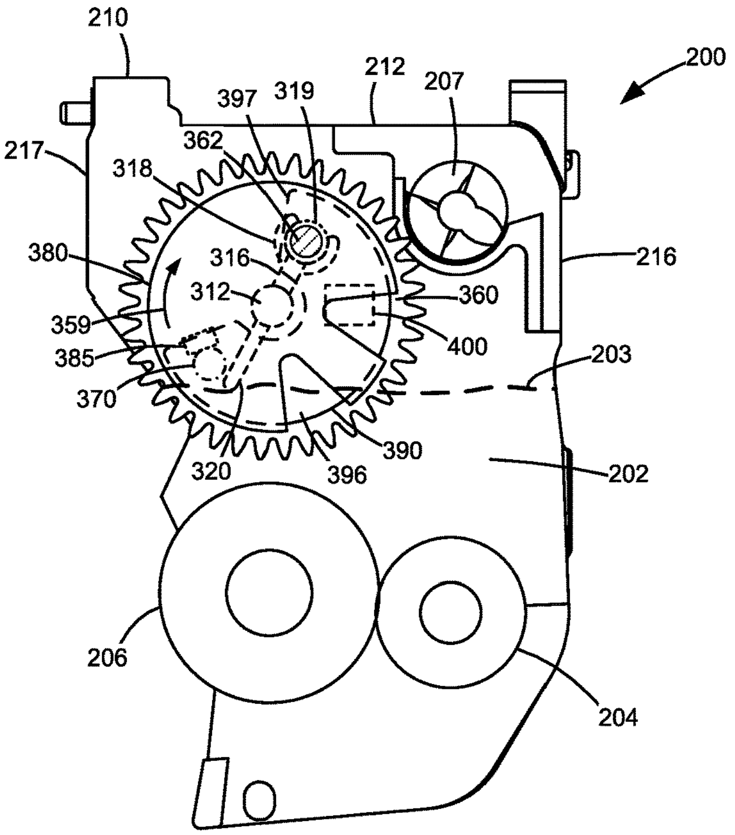
Figure 11D:
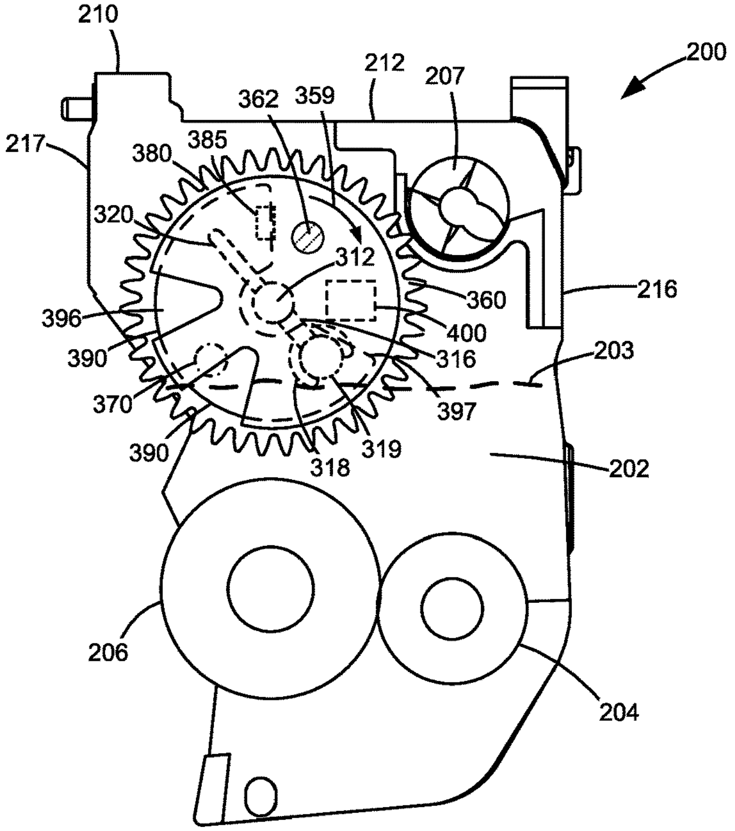

In FIG. 11A, paddle 310 is at a rotational position where first paddle arm 316 including weighted rod 319 is positioned at about 11 o'clock and second paddle arm 320 is positioned at about 5 o'clock relative to shaft 312 with shield 390 on rotatable member 380 blocking magnet 362 on drive member 360. As drive member 360 rotates in rotational direction 359, pin 370 of drive member 360 pushes engagement surface 385 of rotatable member 380 causing rotatable member 380 to rotate with drive member 360 in rotational direction 359 which, in turn, causes shaft 312 and paddle 310 to rotate in rotational direction 359 until paddle 310 reaches the position shown in FIG. 11B where first paddle arm 316 is positioned at about 12 o'clock and second paddle arm 320 is positioned at about 6 o'clock relative to shaft 312. As first paddle arm 316 is pushed through the upper vertical position of rotation (the 12 o'clock position) by drive member 360 as shown in FIG. 11C, paddle 310 tends to separate from the motion of drive member 360 and rotatably advance faster than drive member 360 is being driven due to the toner resistance against second paddle arm 320 being insufficient to prevent weighted rod 319 on first paddle arm 316 from falling forward. In particular, as paddle 310 advances from the position shown in FIG. 11C, shaft 312 rotates with paddle 310 in rotational direction 359 which, in turn, causes rotatable member 380 to also rotate in rotational direction 359 causing engagement surface 385 of rotatable member 380 to separate and move forward away from pin 370 of drive member 360. First paddle arm 316 falls forward in rotational direction 359 under its own weight and that of weighted rod 319 until first paddle arm 316 contacts toner 203, which stops the rotational advance of paddle 310 as shown in FIG. 11D. Paddle 310 remains substantially stationary as free end 318 having weighted rod 319 of first paddle arm 316 rests on top of (or slightly below the surface of) toner 203.

Figure 11E:
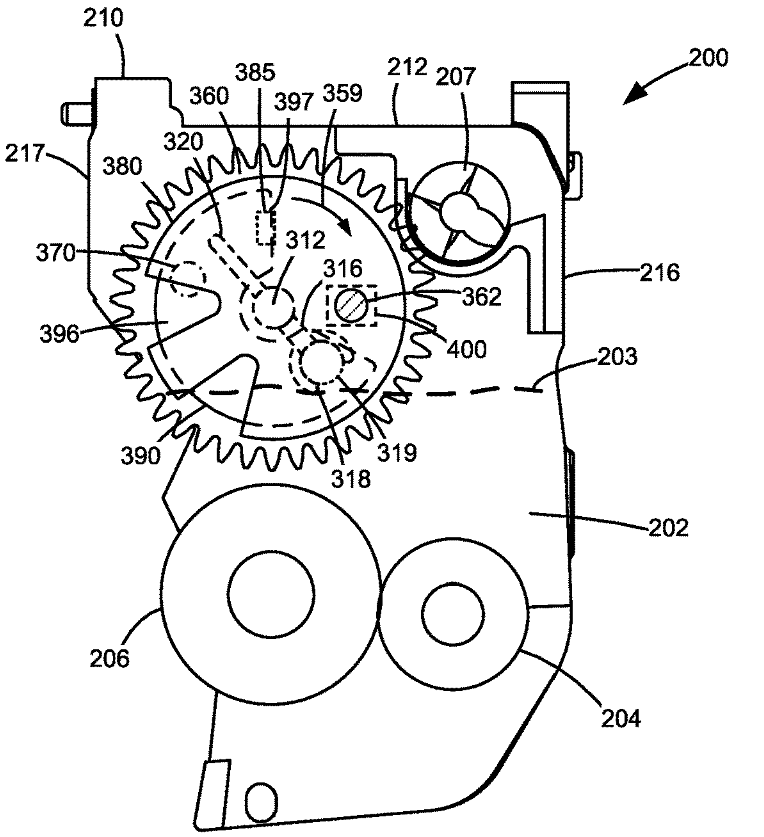

When free end 318 of first paddle arm 316 lands on toner 203 ahead of drive member 360, rotatable member 380 is at a rotational position where cutout portion 397 of shield 390 on rotatable member 380 unblocks magnet 362 as shown in FIG. 11D. Drive member 360 continues to be driven to rotate causing magnet 362 on drive member 360 to rotate in rotational direction 359 from its position shown in FIG. 11D while paddle 310, rotatable member 380, and shield 390 remain stationary after free end 318 of first paddle arm 316 lands on toner 203. With paddle 310, rotatable member 380, and shield 390 remaining stationary, magnet 362 remains unblocked by cutout portion 397 of shield 390 as drive member 360 continues to rotate in rotational direction 359 allowing magnetic sensor 400 to detect magnet 362 on drive member 360 as magnet 362 passes magnetic sensor 400 as shown in FIG. 11E. Detection of magnet 362 by magnetic sensor 400 indicates that paddle 310 has fallen ahead of drive member 360 which caused magnet 362 to be unblocked by shield 390 allowing magnetic sensor 400 to detect magnet 362. The falling motion of paddle 310 (as opposed to a driven motion) may be used to indicate that the toner level in reservoir 202 is relatively low.

Figure 11F:
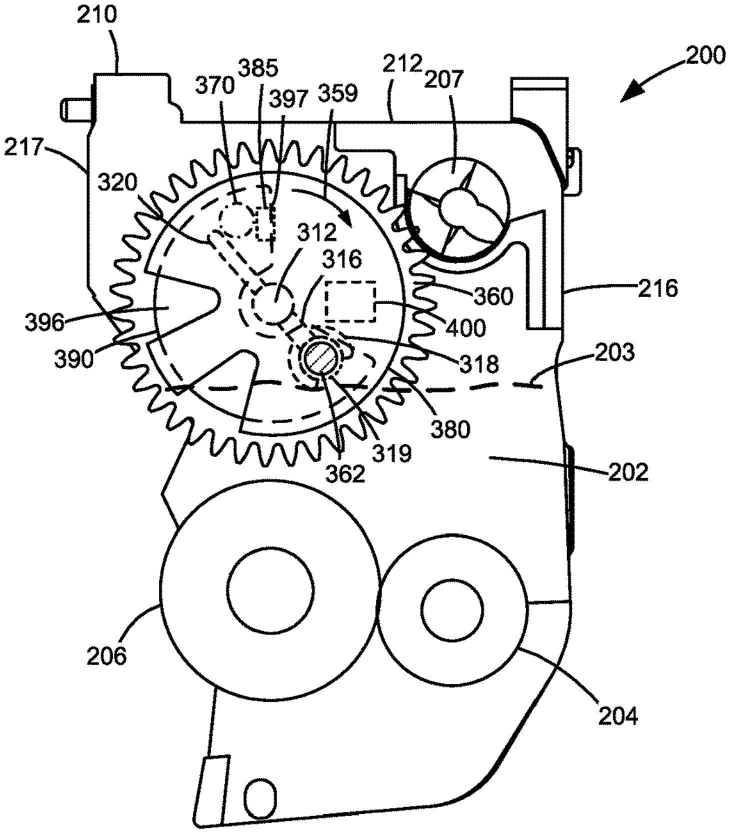
Figure 11G:
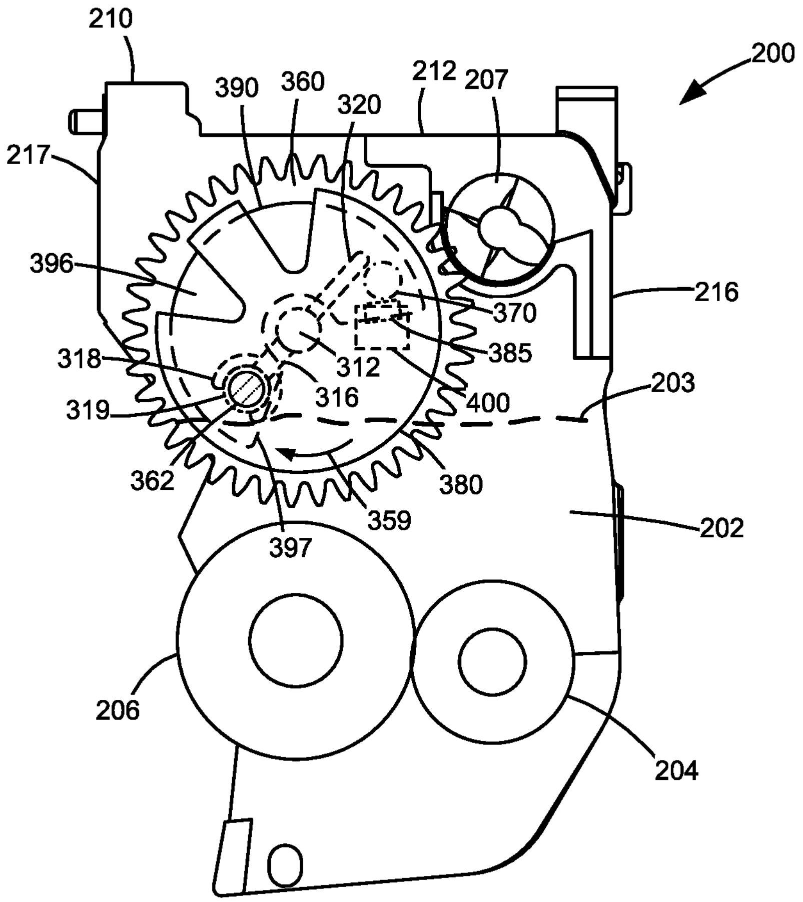

Paddle 310 remains substantially stationary as free end 318 of first paddle arm 316 rests on top of toner 203 until pin 370 of drive member 360 catches up with engagement surface 385 of rotatable member 380 as shown in FIG. 11F, and resumes pushing rotatable member 380 in rotational direction 359 in order to resume driving of paddle 310 to rotate in rotational direction 359 as shown in FIG. 11G.

In one example embodiment, a toner feed operation may be performed in response to detecting a falling motion (as opposed to a driven motion) of paddle 310 as discussed above to feed toner from toner cartridge 100 to developer unit 200 in order to refill reservoir 202 with toner. In one embodiment, reservoir 202 may be refilled with toner by a predetermined amount sufficient to result in a toner level that can provide enough toner resistance that can prevent paddle 310 from falling and rotating ahead of drive member 360, such as the toner level shown in FIGS. 10A and 10B. The estimated amount of toner remaining may be reset again when paddle 310 no longer falls and rotates ahead of drive member 360 as reservoir is refilled with toner. For example, reservoir 202 may be refilled with toner until magnetic sensor 400 no longer detects magnet 362 while drive member 360 rotates as a result of paddle 310 no longer falling and rotating ahead of drive member 360 due to toner resistance. In other embodiments, upon detecting a falling motion of paddle 310 indicating that the toner level in reservoir 202 is low, a user may be prompted to replace developer unit 200, for example, in systems where developer unit 200 houses the main toner supply for image forming device 20.

Accordingly, an amount of toner remaining in a reservoir may be determined by sensing the rotational motion of a falling paddle, such as paddle 310, mounted on a rotatable shaft and rotatable with the shaft within the reservoir. Because the motion of paddle 310 is detectable by a sensor outside of reservoir 202, paddle 310 may be provided without an electrical or mechanical connection to the outside of body 210 (other than shaft 312). This avoids the need to seal an additional connection into reservoir 202, which could be susceptible to leakage. Further, positioning the magnetic sensor outside of reservoir 202 reduces the risk of toner contamination, which could damage the sensor.

Figure 12:
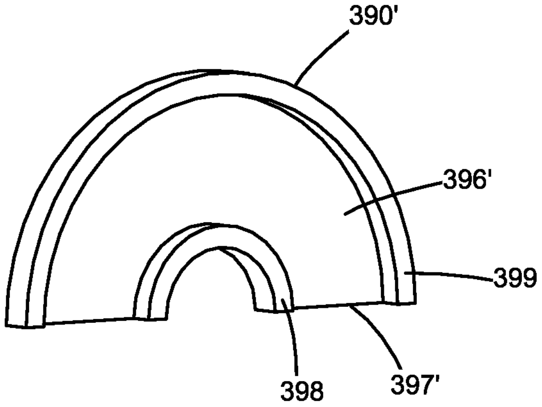
FIG. 12 is a perspective view of a shield of the toner level sensing system according to one example embodiment.

While the example embodiments illustrated show shield 390 positioned on rotatable member 380, it will be appreciated that shield 390 may be arranged differently as desired. For example, shield 390 may be positioned on an arm or other form of extension between magnet 362 and magnetic sensor 400 and connected to shaft 312 in order to rotate with paddle 310. The circumferential length of cutout portion 397 of shield 390 defines an exposure window for magnet 362 to magnetic sensor 400. In the above example embodiment, cutout portion 397 of shield 390 spans about 120 degrees of shield 390. In other embodiments, shield 390 may have other geometries or shapes as desired. For example, in FIG. 12, a shield 390' may include a blocking portion 396' and a cutout portion 397' that each spans about 180 degrees of shield 390'. In another example, shield 390' may include inner and/or outer circumferential borders 398, 399.

Further, in the example embodiment discussed above, the additional weight on first paddle arm 316 allows paddle 310 to fall forward due to gravity which, in turn, causes rotatable member 380 and shield 390 to rotate ahead of drive member 360 when the toner level is relatively low. In other embodiments, additional weight may be provided to other components that are rotatable with paddle 310 that can indirectly cause paddle 310 to fall forward. For example, additional weight may be provided to rotatable member 380 and/or shield 390 so that rotatable member 380 and shield 390 may rotate ahead of drive member 360 in rotational direction 359 to unblock magnet 362 and cause shaft 312 and, in turn, paddle 310 to also rotate in rotational direction 359 until paddle 310 lands on the toner in reservoir 202. In the example embodiment discussed above, toner level sensing system 300 includes a paddle 310 that falls forward rotationally ahead of drive member 360 by way of gravity; however, in other embodiments, paddle 310 may be spring-biased in rotational direction 359, directly or indirectly, such as rotatable member 380 being spring-biased in rotational direction 359.

In the above example embodiment, magnet 362 on drive member 360 moves past magnetic sensor 400 without being detected by magnetic sensor 400 when the toner level is relatively sufficient, and magnet 362 on drive member 360 moves past magnetic sensor 400 and is detected by magnetic sensor 400 when the toner level is relatively low. In this example, magnet 362 on drive member 360 causes the output of the magnetic sensor 400 to change from an undetected state when paddle 310 is rotating with drive member 360 to a detected state if paddle 390 falls and rotates ahead of drive member 360. In other embodiments, reverse logic to that described above may be implemented. For example, shield 390 may be configured such that when the toner level is relatively sufficient, shield 390 unblocks magnet 362 so that magnetic sensor 400 detects magnet 362 when magnet 362 moves past magnetic sensor 400, and when the toner level is relatively low, shield 390 blocks magnet 362 so that magnet 362 moves past magnetic sensor 400 without being detecting by magnetic sensor 400. In this example, magnet 362 on drive member 360 causes the output of the magnetic sensor 400 to change from a detected state when paddle 310 is rotating with drive member 360 to an undetected state if paddle 390 falls and rotates ahead of drive member 360.

In the example embodiment discussed above, magnet 362 is positioned outside of reservoir 202 of developer unit 200, such as on drive member 360. However, in other embodiments, magnet 362 may be positioned within reservoir 202, including, for example, attached to paddle 310 or an extension from paddle 310 or shaft 312.

In the example embodiment illustrated, paddle 310 and shaft 312 are rotatable with rotatable member 380, independent of drive member 360. However, in other embodiments, shaft 312 is fixed to rotate with drive member 360, and paddle 310 is rotatable independent of shaft 312.

In the example embodiment illustrated, magnet 362 is fixed to rotate with drive member 360 and shield 390 is rotatable independent of drive member 360 in order to block and unblock magnet 362 depending on the toner level within reservoir 202. In other embodiments, this configuration may be reversed such that shield 390 is fixed to rotate with drive member 360 and magnet 362 is rotatable independent of drive member 360 in order to block and unblock magnet 362 depending on the toner level within reservoir 202.

In the example embodiment discussed above, toner level sensing system 300 is configured to detect when the toner level in reservoir 202 of developer unit 200 falls below a predetermined threshold. However, in other embodiments, toner level sensing system 300 may be employed to detect the toner level in any toner reservoir, such as, for example, reservoir 102 of toner cartridge 100 or a waste toner reservoir storing toner cleaned from the surfaces of one or more PC drums 502 and/or ITM 54.

Further, although the example image forming device 20 discussed above includes four toner cartridges 100 and corresponding developer units 200 and PC units 500, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use in an image forming device, comprising:

a housing having a reservoir for storing toner;

a rotatable paddle positioned within the reservoir;

a rotatable drive member positioned to push the paddle in a first rotational direction, the paddle is free to rotate ahead of the drive member in the first rotational direction;

a magnet having a magnetic field, the magnet is rotatably coupled to one of the paddle and the drive member; and a shield rotatably coupled to the other of the paddle and the drive member such that the shield is movable between a blocking position for attenuating the magnetic field of the magnet to block detection of the magnetic field by a magnetic sensor and an unblocking position for unblocking the magnetic field of the magnet to permit detection of the magnetic field by the magnetic sensor based on a rotational position of the paddle relative to the drive member.

2. The toner container of claim 1, wherein the magnet is rotatably coupled to the drive member and the shield is rotatably coupled to the paddle.

3. The toner container of claim 1, wherein the drive member is positioned outside of the reservoir.

4. The toner container of claim 3, wherein the magnet is positioned on the drive member.

5. The toner container of claim 3, further comprising a rotatable member positioned outside of the reservoir and rotatably coupled to the paddle, the drive member is positioned to contact and push the rotatable member in the first rotational direction.

6. The toner container of claim 3, further comprising a rotatable member positioned outside of the reservoir and rotatably coupled to the paddle, the shield is positioned on the rotatable member.

7. The toner container of claim 1, wherein the shield is in the blocking position when the drive member is pushing the paddle in the first rotational direction and the shield is in the unblocking position when the paddle rotates ahead of the drive member in the first rotational direction.

8. A toner container for use in an image forming device, comprising:

a housing having a reservoir for storing toner;

a rotatable drive coupler positioned to receive rotational force from a corresponding drive coupler in the image forming device when the toner container is installed in the image forming device;

a paddle positioned within the reservoir and operatively connected to the drive coupler such that the paddle is rotatable in response to rotation of the drive coupler, the paddle is rotatable independent of the drive coupler;

a magnet having a magnetic field, the magnet is fixed to rotate with one of the paddle and the drive coupler; and a shield fixed to rotate with the other of the paddle and the drive coupler such that the shield is movable between a blocking position for attenuating the magnetic field of the magnet to block detection of the magnetic field by a magnetic sensor and an unblocking position for unblocking the magnetic field of the magnet to permit detection of the magnetic field by the magnetic sensor depending on a rotational position of the paddle relative to the drive coupler.

9. The toner container of claim 8, wherein the magnet is fixed to rotate with the drive coupler and the shield is fixed to rotate with the paddle.

10. The toner container of claim 9, further comprising a drive member rotatably coupled to the drive coupler, the magnet is positioned on the drive member.

11. The toner container of claim 10, wherein the drive member is positioned outside of the reservoir.

12. The toner container of claim 11, further comprising a rotatable member positioned outside of the reservoir and fixed to rotate with the paddle, the shield is positioned on the rotatable member.

13. A toner container for use in an image forming device, comprising:

a housing having a reservoir for storing toner;

a rotatable shaft positioned within the reservoir;

a paddle mounted on the shaft within the reservoir and fixed to rotate with the shaft;

a drive member mounted on the housing outside of the reservoir and rotatable about the shaft independent of the shaft;

a magnet fixed to rotate with the drive member, the magnet has a magnetic field that is detectable by a magnetic sensor; and a shield fixed to rotate with the shaft and the paddle, the drive member is positioned to rotate the shield when the drive member rotates, the shield is free to rotate ahead of the drive member, wherein the shield selectively blocks and unblocks the magnet from the magnetic sensor in response to rotation of the drive member for indicating a toner level in the reservoir.

14. The toner container of claim 13, wherein the magnet is positioned on the drive member.

15. The toner container of claim 14, further comprising a rotatable member positioned outside of the reservoir and fixed to rotate with the paddle, the shield is positioned on the rotatable member.

16. The toner container of claim 13, wherein the shield blocks the magnet when the drive member is rotating the shield and the shield unblocks the magnet when the shield rotates ahead of the drive member.

* * * * *